(12) United States Patent
Rueckheim et al.

(10) Patent No.: US 8,770,432 B2
(45) Date of Patent: Jul. 8, 2014

(54) WASH BUCKET

(75) Inventors: Markus Rueckheim, Griesheim (DE); Andreas Eisenhut, Leimen (DE); Georg Huber, Bad Aibling (DE); Isik Ozkan, Suttgart (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 13/395,808

(22) PCT Filed: Sep. 2, 2010

(86) PCT No.: PCT/EP2010/005386
§ 371 (c)(1),
(2), (4) Date: May 17, 2012

(87) PCT Pub. No.: WO2011/038822
PCT Pub. Date: Apr. 7, 2011

(65) Prior Publication Data
US 2012/0228304 A1 Sep. 13, 2012

(30) Foreign Application Priority Data
Oct. 1, 2009 (DE) .......................... 10 2009 043 686

(51) Int. Cl.
*B65D 21/032* (2006.01)
*B65D 25/04* (2006.01)
*B65D 57/00* (2006.01)

(52) U.S. Cl.
USPC ........ 220/523; 220/23.89; 220/500; 220/529; 220/533; 220/528; 220/506; 220/4.27; 220/544; 206/504

(58) Field of Classification Search
USPC .............. 220/23.89, 500, 529, 532, 533, 528, 220/506, 4.27, 544; 206/504
See application file for complete search history.

(56) References Cited

U.S. PATENT DOCUMENTS

| | | | | |
|---|---|---|---|---|
| 4,436,215 A * | 3/1984 | Kleinert et al. | ............... | 220/533 |
| 5,082,139 A * | 1/1992 | Quam | ........................... | 220/530 |
| 5,094,375 A * | 3/1992 | Wright | ........................ | 224/404 |
| 5,615,797 A * | 4/1997 | Ripamonti | .................... | 220/529 |
| 5,676,241 A * | 10/1997 | Degoix et al. | .................... | 206/3 |
| 6,851,566 B1 * | 2/2005 | Bonner | ........................ | 220/4.27 |
| 7,721,362 B2 * | 5/2010 | Martin et al. | .................... | 4/514 |
| 2002/0096525 A1 * | 7/2002 | Bertoldo et al. | .............. | 220/544 |
| 2004/0007577 A1 | 1/2004 | Zorzo | | |
| 2006/0070202 A1 | 4/2006 | Lauer et al. | | |
| 2009/0057305 A1 * | 3/2009 | Moreau | ........................ | 220/4.27 |

FOREIGN PATENT DOCUMENTS

| | | |
|---|---|---|
| EP | 1 382 535 A1 | 1/2004 |
| EP | 1 516 575 A2 | 3/2005 |
| FR | 2 898 801 A1 | 9/2007 |

\* cited by examiner

*Primary Examiner* — Fenn Mathew
*Assistant Examiner* — Jennifer Castriotta
(74) *Attorney, Agent, or Firm* — Leydig, Voit & Mayer, Ltd.

(57) ABSTRACT

The invention relates to a wash bucket (1), the volume of which can be divided by means of a separate partition (2) into at least two compartments (3, 4). Projections (7) are disposed on at least two mutually opposing lateral walls (5, 6).

23 Claims, 7 Drawing Sheets

WASH BUCKET

CROSS-REFERENCE TO RELATED APPLICATIONS

The patent is the national phase of PCT/EP2010/005386, filed Sep. 2, 2010, which claims the benefit of German Patent Application No. 10 2009 043 686.3, filed Oct. 1, 2009.

FIELD OF THE INVENTION

The present invention pertains to a wash bucket, the volume of which can be divided into at least two compartments by means of a device.

BACKGROUND OF THE INVENTION

Wash buckets, the volume of which can be divided into at least two compartments, are generally known. For example, a device such as a partition wall can serve for dividing the volume of the wash bucket into two partial volumes. This partition wall makes it possible to separate clean and dirty mopping water. For example, a wringer may be arranged in the partial volume that holds the dirty mopping water. During the cleaning process, the soiled cleaning textile is initially pre-rinsed in the dirty mopping water and wrung out, and subsequently rinsed in the clean mopping water and wrung out again. This makes it possible to prevent the clean mopping water from quickly becoming polluted, for example, with coarse particles. In known wash buckets, a groove, i.e., a depression, is provided for fixing the partition wall, with the usually planar, plate-shaped partition wall can be guidable and fixable in said groove. With respect to this groove, however, it is a problem that contaminants and, in particular, germs can accumulate in the groove due to its poor accessibility and thereby contaminate the mopping water.

SUMMARY OF THE INVENTION

An object of the invention is to provide a wash bucket that can be cleaned and protected from germs in a superior manner.

To this end, projections are arranged on at least two opposing side walls of the wash bucket. The projections originate at the side walls and protrude into the interior volume of the wash bucket. In this case, the wash bucket contains no dead spot whatsoever in which contaminants and germs can accumulate. In addition, the projections can be cleaned in a particularly simple manner.

The bottom may be provided with projections on the inner side. With such an arrangement, all three abutting peripheries of the wash bucket are provided with projections such that a dividing device, particularly a partition wall, can be fixed in a very secure fashion and an optimal seal of the partial volumes defined by the partition wall is ensured.

The projection may extend continuously along the side walls and the bottom. This results in a bead that is arranged along both entire side walls and along the entire bottom.

The projections may be configured in the form of a bead. In such a case, the bead may be configured, in particular, with a convex cross section such as, for example, a triangular, trapezoidal, rectangular or circular arc-shaped cross section. A triangular and trapezoidal design is preferred because the cross section of a thusly shaped bead does not have any acute angle on which germs could accumulate, and the partition wall is also easier to remove from the wash bucket in this case. It would also be conceivable to configure these shapes in a rounded fashion. In this case, the triangular and the trapezoidal design, as well as their rounded variations, feature side parts that are inclined toward one another.

The height and/or the width of the bead may decrease from the bottom in the direction of the rim of the wash bucket. In such an embodiment, the height and/or the width of the bead is greatest in the region of the bottom and decreases on the side parts in the direction of the rim of the wash bucket. Due to this measure, the device, particularly a partition wall, can be removed in a very simple fashion because it is not constantly guided on the bead during the removal.

The dividing device may be configured in the form of a partition wall, with the edges of the partition wall that contact the two side walls and the bottom being configured congruently with respect to the bead. To this end, the edges of the partition wall are preferably configured in a concave manner. Depending on the shape of the bead, the edges of the partition wall therefore feature a triangular, trapezoidal, rectangular or circular arc-shaped circumferential recess. The partition wall consequently covers the bead such that only a small dead space in which germs and contaminants can accumulate exists when the partition wall is inserted. The edges of the partition wall with the recess also can be easily accessed and therefore adequately cleaned and, if necessary, disinfected.

The partition wall may include a separating device that is assigned to a respective side wall. In an advantageous embodiment, the separating device lies on the rim of the wash bucket and can be displaced laterally, i.e., parallel to the bottom. The displacement may take place against the force of a spring. A lower edge of the separating device that partially lies on the rim of the wash bucket is inclined such that the partition wall is lifted out of the wash bucket when the separating device is displaced. In this case, it is advantageous that the partition wall can be removed very easily and, in particular, when only one partial volume of the wash bucket is filled such that a lateral force acts upon the partition wall. The controlled lifting of the partition wall by means of the separating device also provides the advantage that, if the partial volumes are unevenly filled, sloshing or splashing of the mopping water due to an abrupt liquid equalization is largely prevented. If no separating device is provided, a considerable force is required to separate and lift the partition wall out of the sealing position such that the entire removal of the partition wall becomes more complicated.

The partition wall may be provided with one or more snap-on mechanisms for fixing the partition wall in the wash bucket. These snap-on means may be, for example, in the form of snap hooks that snap on the upper rim of the wash bucket and prevent the partition wall from separating by itself.

The partition wall may feature a grab handle. The grab handle is preferably arranged centrally on the upper edge of the partition wall and allows the easy removal and transport thereof.

The edges of the partition wall may be provided with a sealing element. In this case, the sealing element may be in the form of a circumferential elastomer track that is arranged directly in or directly adjacent to the concave region of the edge. In this case, it would be conceivable, in particular, to manufacture the partition wall by means of multi-component injection molding, wherein the sealing element comprises an elastomer material that can be injection-molded. It would likewise be conceivable that the region of the partition wall that contacts the wash bucket, i.e., the entire region of the edge, comprises an elastomer material. The sealing element improves the tightness in the edge region such that an overflow of liquid between the two volumes of the wash bucket can be prevented. Alternatively, it would also be conceivable to arrange the sealing element in the region of the projections of the wash bucket.

The dividing device could also comprise an additional second wash bucket that may be arranged inside the first wash bucket. In this embodiment, the interior volume of the first wash bucket is divided into two partial volumes by the second wash bucket.

The additional second wash bucket may be held in its position by the projections of the first wash bucket. To this end, the second wash bucket may feature recesses that are configured congruently relative to the bead or are dimensioned such that it abuts on the bead. In this way, the second wash bucket is prevented from shifting in the first wash bucket.

BRIEF DESCRIPTION OF THE SEVERAL VIEWS OF THE DRAWINGS

A few exemplary embodiments of the inventive wash bucket are described in greater detail below with reference to the figures.

DETAILED DESCRIPTION OF THE INVENTION

Figure 1:
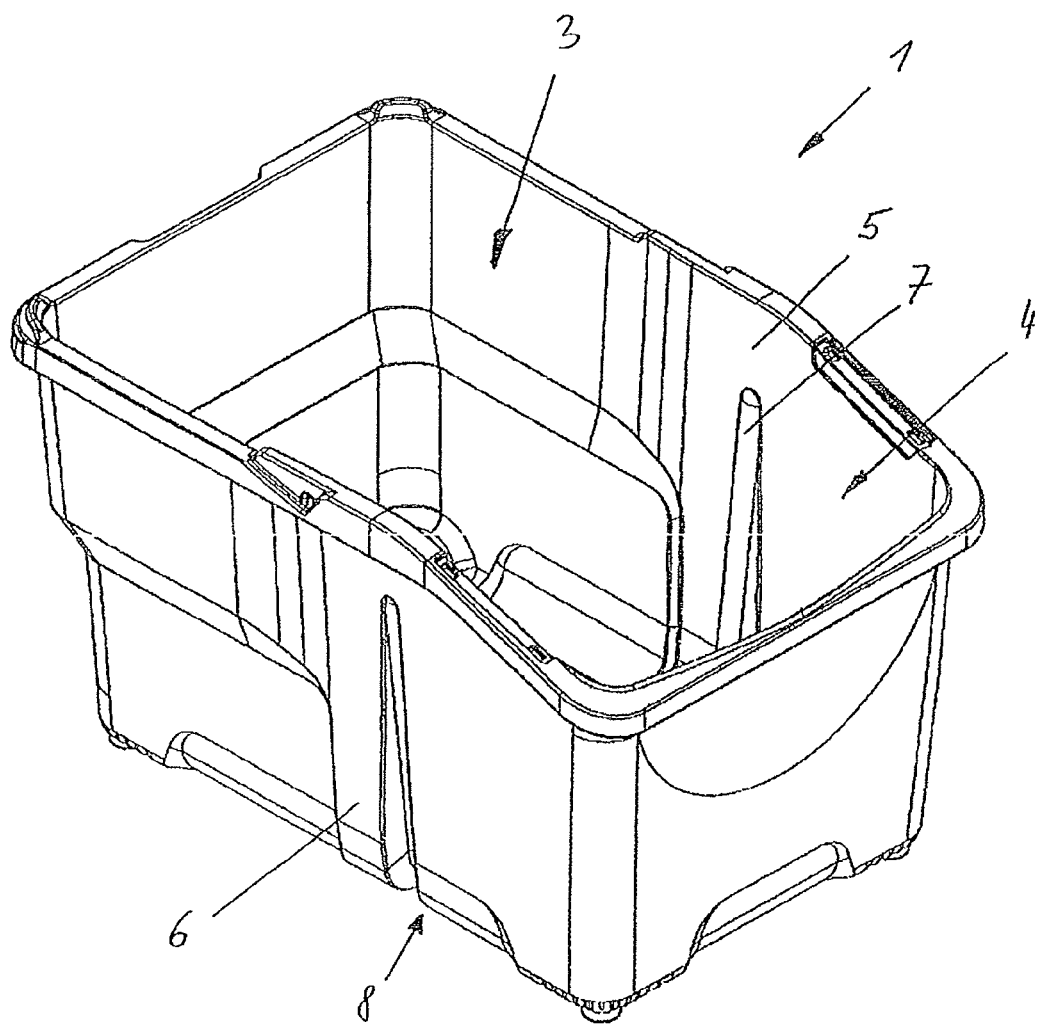
FIG. 1 is a schematic perspective view of an exemplary wash bucket according to the invention.

FIG. 1 illustrates a wash bucket 1 that forms part of a cleaning system including a wash bucket 1, a cleaning mop and a wringer attached onto the wash bucket 1. The interior of the wash bucket, i.e., its volume, can be divided into at least two compartments 3, 4 by a dividing device 2. In order to engage and fix the dividing device 2, projections 7 are arranged on the inner side of the wash bucket 1 on the two opposite side walls 5, 6 and on the bottom 8. These projections extend continuously along the side walls 5, 6 and the bottom 8 and are in the form of a bead. The bead has a triangular cross section, wherein the edges are rounded such that the bead has side parts that are inclined toward one another. The bead is furthermore configured such that the height and the width of the bead decrease from the bottom in the direction of the rim of the wash bucket 1.

Figure 2:
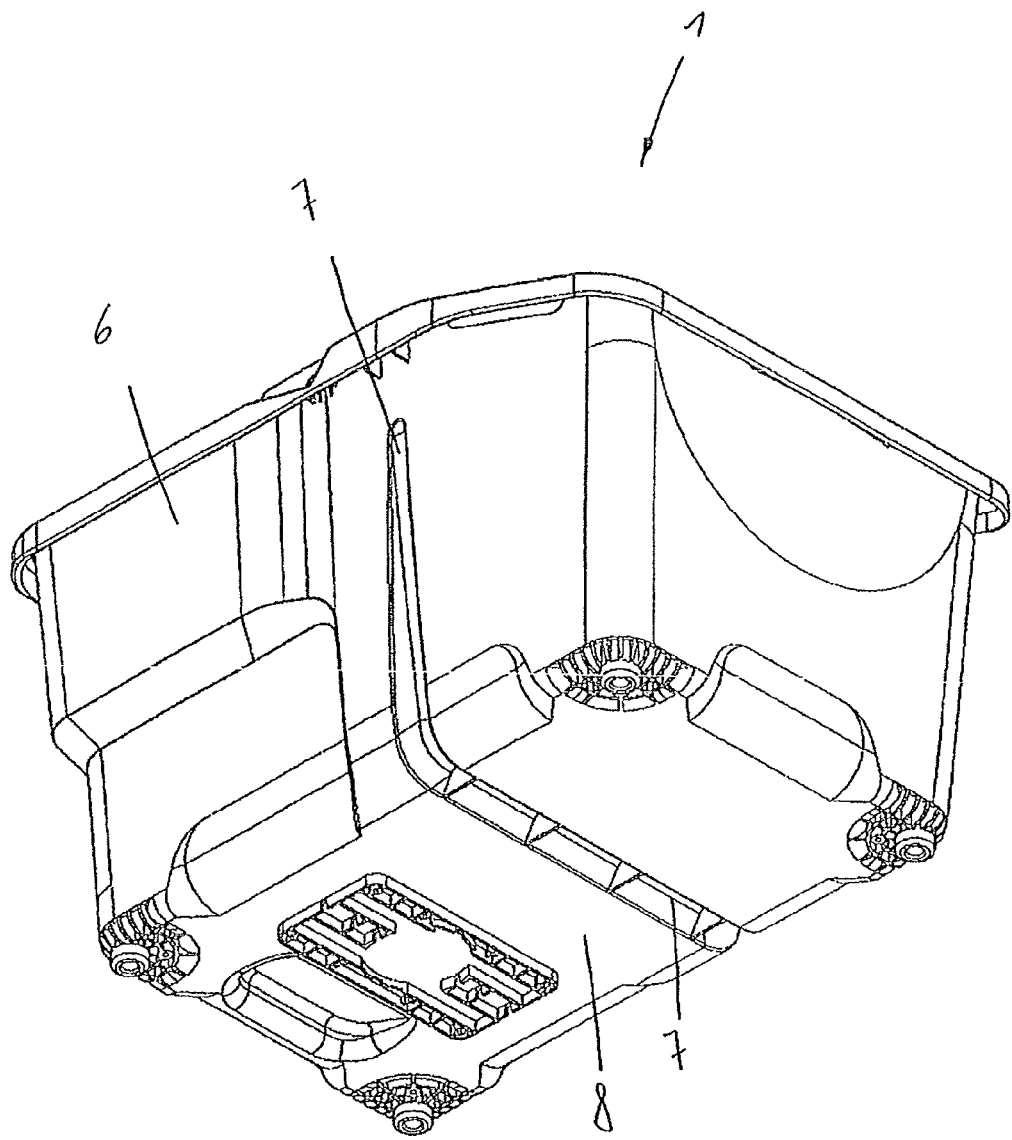
FIG. 2 is a schematic bottom perspective view of the wash bucket according to FIG. 1.

FIG. 2 is a bottom view of the wash bucket 1 according to FIG. 1.

Figure 3:
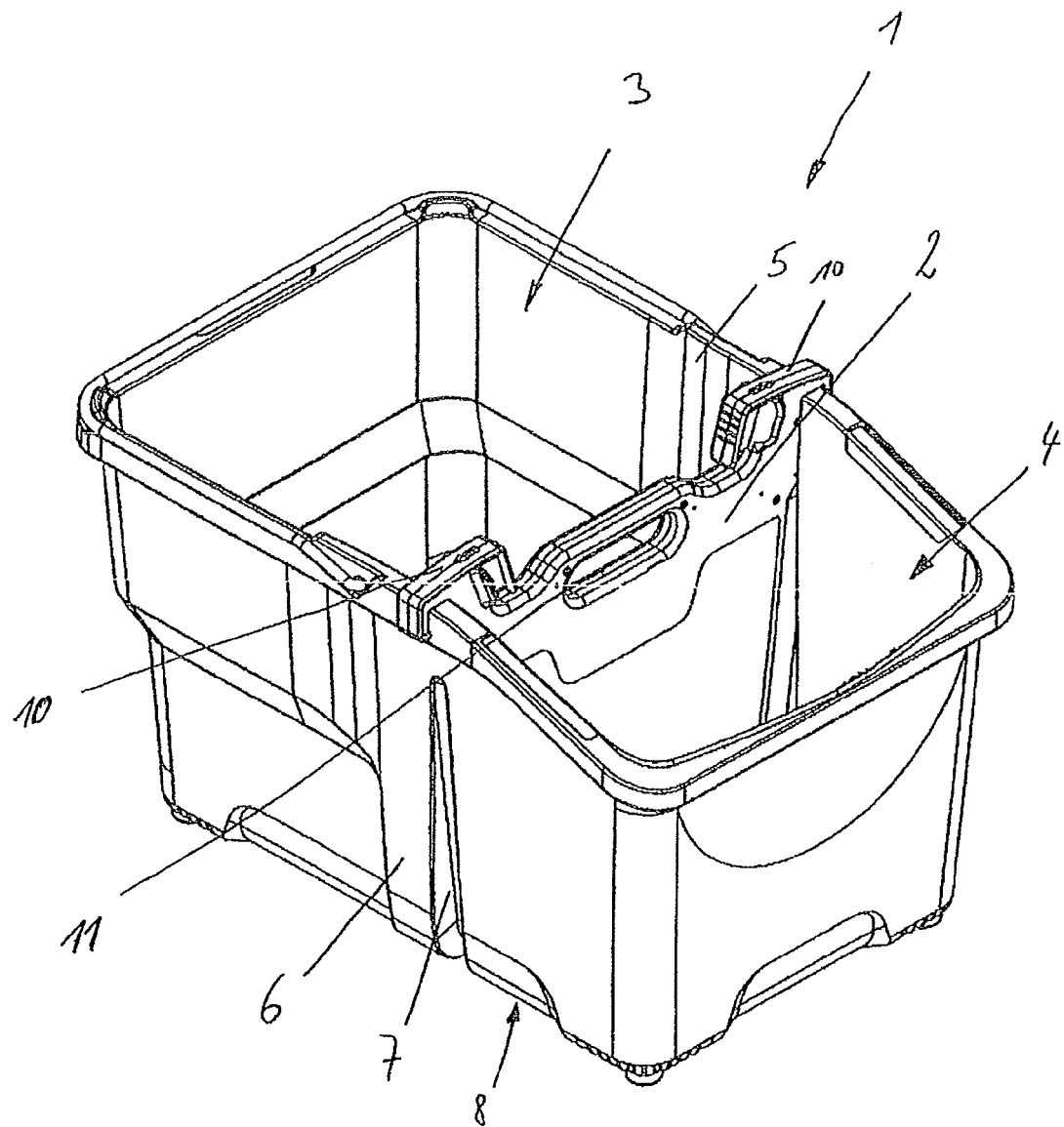
FIG. 3 is a schematic perspective view of the bucket according to FIG. 1 with an inserted partition wall.

FIG. 3 shows the wash bucket 1 according to FIG. 1 with a dividing device 2 that in this embodiment is in the form of a partition wall. The edges of the partition wall that contact the two side walls 5,6 and the bottom 8 of the wash bucket are configured congruently relative to the bead such that the partition wall engages on the bead. The partition wall features a grab handle 11 on its upper edge.

Figure 4:
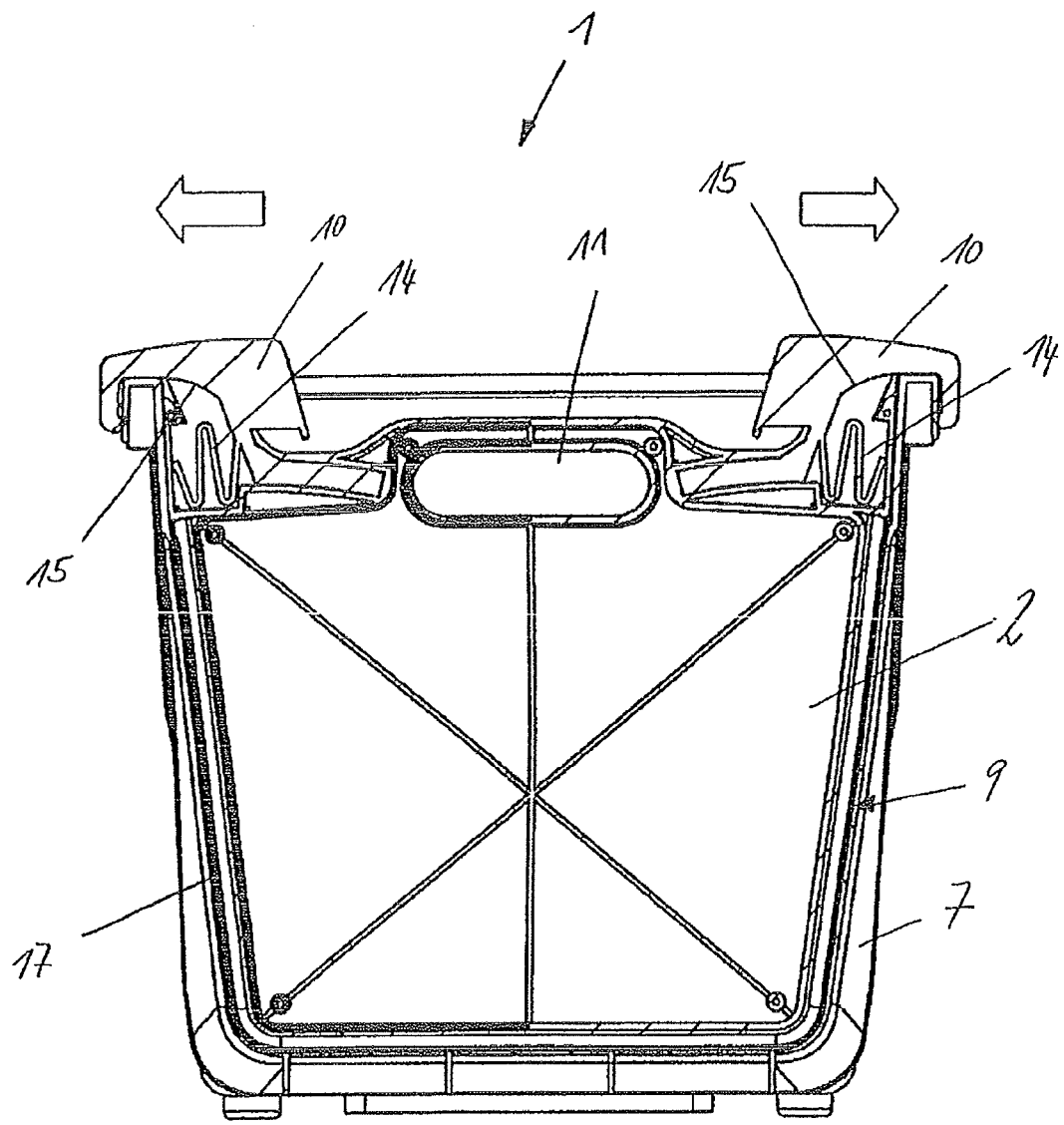
FIG. 4 is a schematic cross-sectional view of the wash bucket of FIG. 1 with inserted partition wall and including a separating device.

FIG. 4 also shows a wash bucket 1 according to FIG. 3. In this embodiment, the dividing device 2 comprises a partition wall and is provided with separating devices 10, with a separating device 10 being respectively assigned to each side wall 5, 6. The separating device 10 lies on the rim of the wash bucket 1 and can be displaced laterally, i.e., parallel to the bottom 8. This displacement takes place against the force of a spring 14. The lower edge 15 of the separating device 10 that partially lies on the rim of the wash bucket 1 is inclined such that the partition wall is lifted when the separating device 10 is displaced. The edge 9 of the partition wall is provided with a sealing element 17 of elastomer material.

Figure 5:
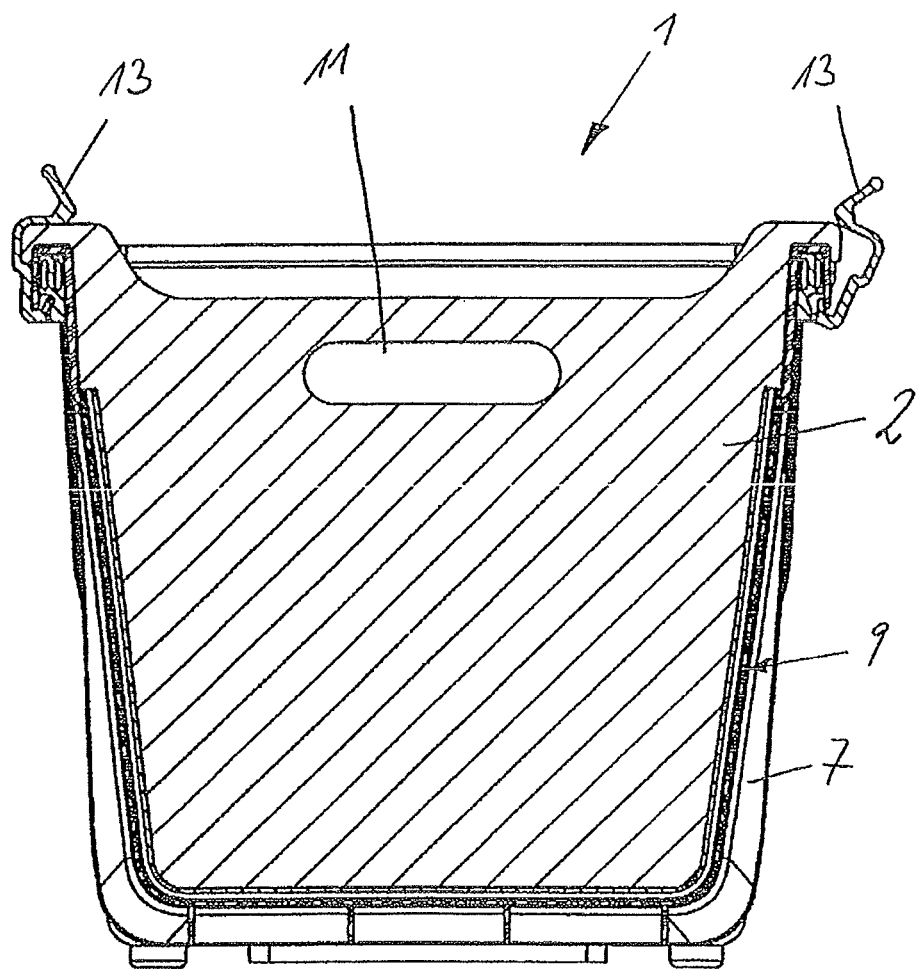
FIG. 5 is a schematic cross-sectional view of the wash bucket of FIG. 1 with inserted partition wall.

FIG. 5 shows a wash bucket according to FIG. 3. The wash bucket is provided with snap-on mechanisms 13 in order to fix the dividing device 2, which also comprises a partition wall in this case, on the wash bucket 1. For this purpose, snap hooks that encompass and thereby fix the partition wall on the wash bucket 1 are arranged in the area of the rim of the wash bucket 1.

Figure 6:
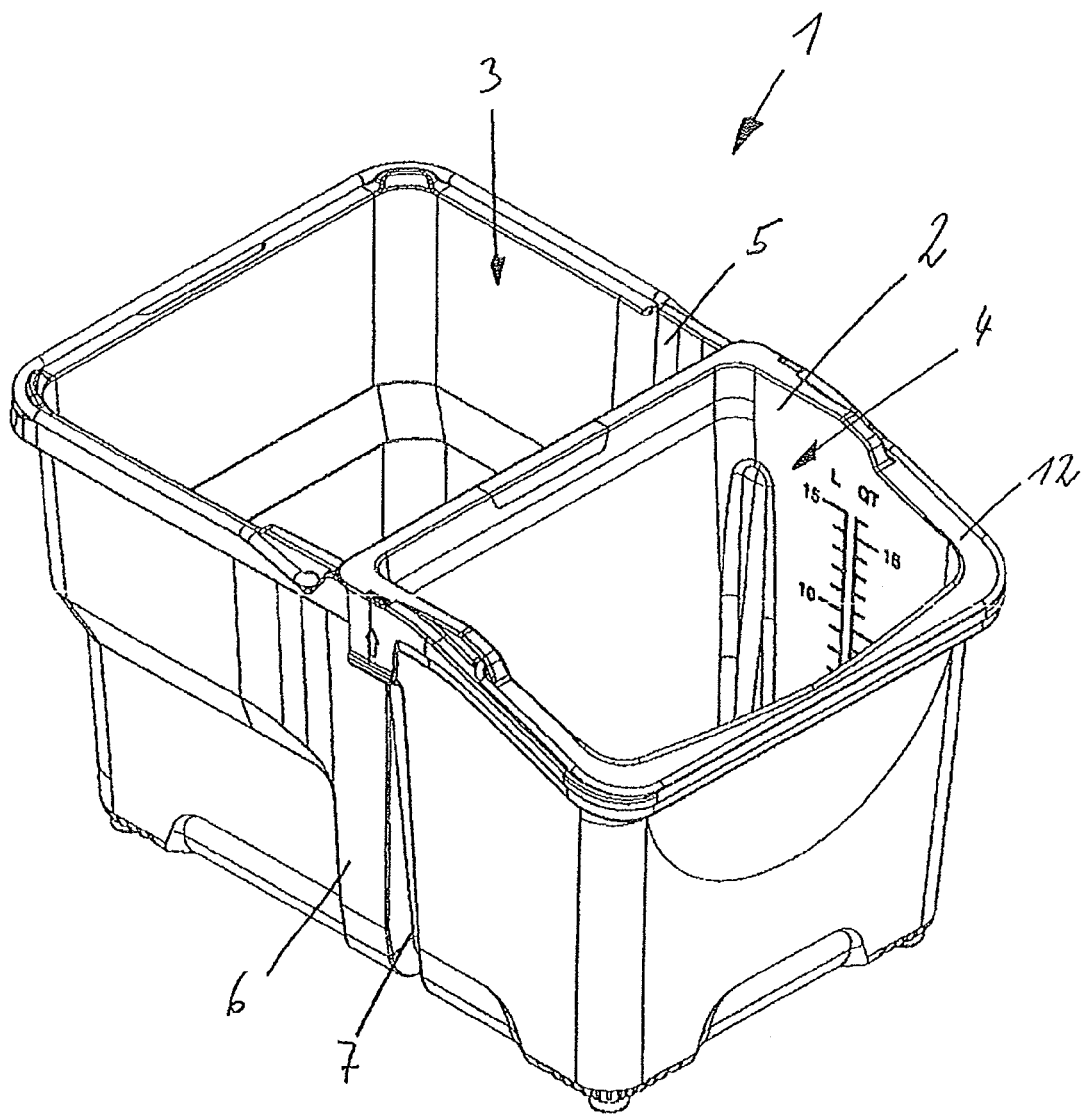
FIG. 6 is a schematic perspective view of an alternative embodiment of a wash bucket in which the dividing device comprises a second wash bucket.

FIG. 6 shows a wash bucket 1 according to FIG. 1, wherein the dividing device 2 is in the form of an additional second wash bucket 12. The additional second wash bucket 12 is configured in such a way that it is fixed in its position in the wash bucket 1 by the projection 7.

Figure 7:
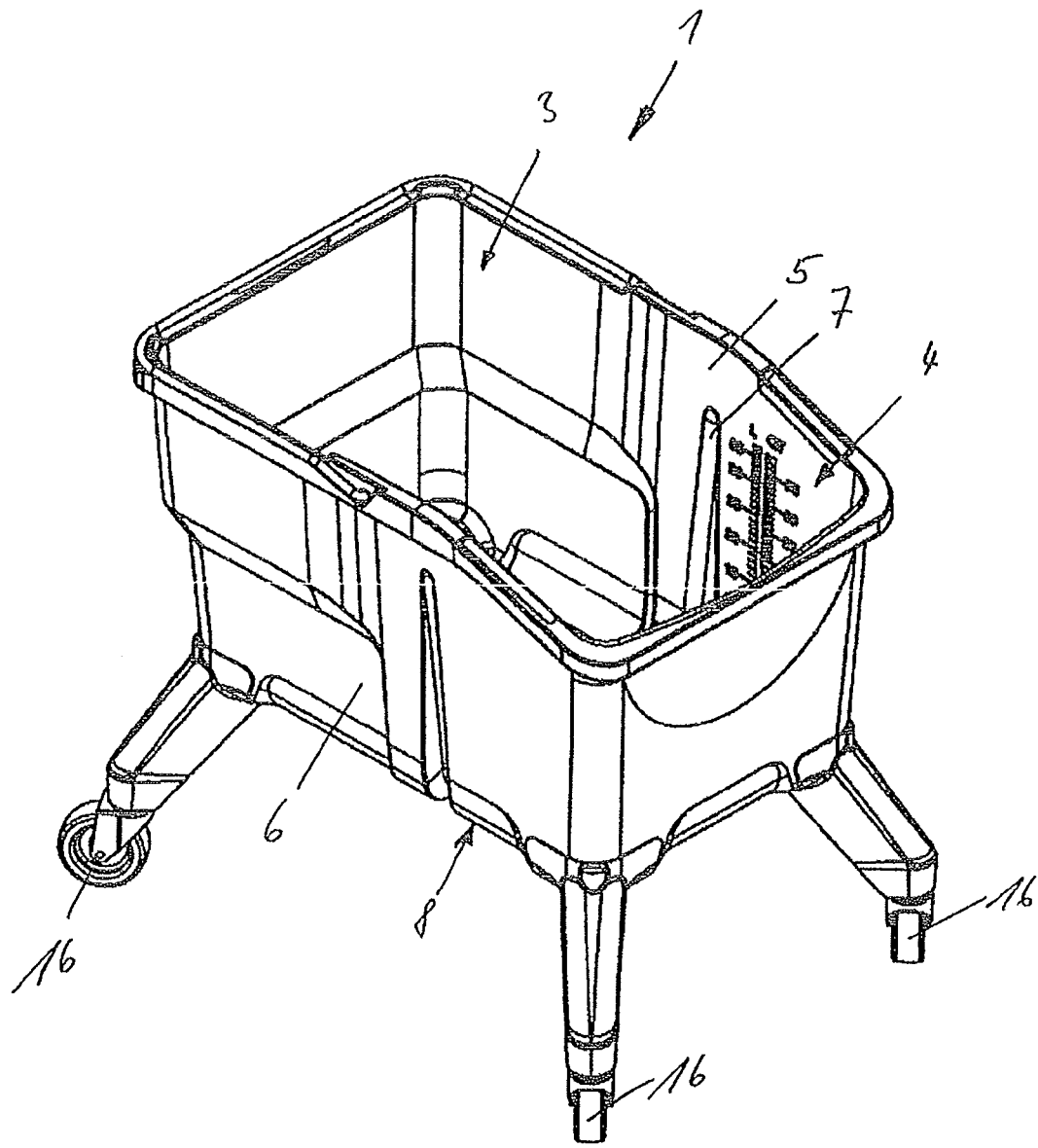
FIG. 7 is a schematic perspective view of an illustrative wash bucket according to the invention with wheels.

FIG. 7 shows a wash bucket 1 according to FIG. 1 that is provided with wheels 16.

The invention claimed is:

1. A wash bucket comprising: two opposing side walls, a bottom, a dividing device for dividing an internal volume of the wash bucket into at least two compartments, and projections arranged on the two opposing side walls and the bottom, the dividing device being engageable with the projections, wherein the projections on the opposing side walls and the bottom extend continuously into one another along the side walls and the bottom and are in the form of a single bead, the bead having a height that decreases gradually from the bottom in the direction of a rim of the wash bucket.

2. The wash bucket according to claim 1, wherein the bead has side parts that are inclined toward one another.

3. The wash bucket according to claim 1, wherein a width of the bead decreases from the bottom in the direction of a rim of the wash bucket.

4. The wash bucket according to claim 1, wherein the dividing device comprises a partition wall, the partition wall having edges that are engageable with the projections with the edges being configured congruently relative to the projections.

5. The wash bucket according to claim 4, wherein the partition wall includes a separating device assigned to each side wall of the wash bucket.

6. The wash bucket according to claim 4, wherein the partition wall includes snap-on mechanisms for fixing the partition wall in the wash bucket.

7. The wash bucket according to claim 4, wherein the partition wall includes a grab handle.

8. The wash bucket according to claim 4, wherein the edges of the partition wall are provided with a sealing element.

9. The wash bucket according to claim 1, wherein the dividing device comprises a second wash bucket.

10. The wash bucket according to claim 9, wherein the second wash bucket is held in its position by the projections.

11. The wash bucket according to claim 1, wherein the bead is shaped in a round fashion.

12. A wash bucket comprising: two opposing side walls, a bottom, a dividing device for dividing an internal volume of the wash bucket into at least two compartments, and projections arranged on the two opposing side walls and the bottom, the dividing device being engageable with the projections, wherein the projections on the opposing side walls and the bottom extend continuously into one another along the side walls and the bottom and are in the form of a single bead, the bead having a width that decreases gradually from the bottom in the direction of a rim of the wash bucket.

13. The wash bucket according to claim 12, wherein the bead has side parts that are inclined toward one another.

14. The wash bucket according to claim 12, wherein the dividing device comprises a partition wall, the partition wall having edges that are engageable with the projections with the edges being configured congruently relative to the projections.

15. The wash bucket according to claim 14, wherein the partition wall includes a separating device assigned to each side wall of the wash bucket.

16. The wash bucket according to claim 14, wherein the partition wall includes snap-on mechanisms for fixing the partition wall in the wash bucket.

17. The wash bucket according to claim 14, wherein the partition wall includes a grab handle.

18. The wash bucket according to claim 14, wherein the edges of the partition wall are provided with a sealing element.

19. The wash bucket according to claim 12, wherein the dividing device comprises a second wash bucket.

20. The wash bucket according to claim 19, wherein the second wash bucket is held in its position by the projections.

21. The wash bucket according to claim 12, wherein the bead is shaped in a round fashion.

22. The wash bucket according to claim 1, wherein the height of the bead decreases in a continuous gradient from the bottom in the direction of a rim of the wash bucket.

23. The wash bucket according to claim 12, wherein the width of the bead decreases in a continuous gradient from the bottom in the direction of a rim of the wash bucket.

* * * * *